(12) United States Patent
Ishida

(10) Patent No.: US 7,204,628 B2
(45) Date of Patent: Apr. 17, 2007

(54) LIGHTING DEVICE FOR VEHICLE

(75) Inventor: Hiroyuki Ishida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 226 days.

(21) Appl. No.: 10/895,107

(22) Filed: Jul. 21, 2004

(65) Prior Publication Data

US 2005/0041436 A1    Feb. 24, 2005

(30) Foreign Application Priority Data

Aug. 5, 2003    (JP)  .......................... P.2003-286883

(51) Int. Cl.
     *F21V 13/04* (2006.01)
(52) U.S. Cl. ...................... 362/545; 362/238; 362/247; 362/549
(58) Field of Classification Search ................ 362/238, 362/247, 518, 543, 544, 545, 546, 549, 800
See application file for complete search history.

(56) References Cited

U.S. PATENT DOCUMENTS

| | | | |
|---|---|---|---|
| 6,406,172 B1 | 6/2002 | Harbers et al. | |
| 6,450,663 B1 * | 9/2002 | Reinbach | ...................... 362/249 |
| 6,945,672 B2 * | 9/2005 | Du et al. | ...................... 362/241 |
| 2001/0019486 A1 | 9/2001 | Thominet | |
| 2002/0006039 A1 | 1/2002 | Ueda et al. | |
| 2002/0118548 A1 * | 8/2002 | Kuenstler et al. | ........... 362/518 |

FOREIGN PATENT DOCUMENTS

| | | |
|---|---|---|
| DE | 199 23 187 A1 | 11/2000 |
| DE | 201 02 587 U1 | 5/2001 |
| DE | 100 05 795 C2 | 8/2001 |
| DE | 202 00 571 U1 | 11/2002 |
| DE | 203 01 627 U1 | 4/2003 |
| EP | 1 298 382 A1 | 4/2003 |
| GB | 2 324 435 A | 4/2000 |
| JP | 11-306810 A | 11/1999 |
| JP | 2003-31007 A | 1/2003 |
| JP | 2003 031011 A | 1/2003 |

OTHER PUBLICATIONS

Official Action of the German Patent and Trademark Office, Official File No. 10 2004 038 065. 1-54, dated Nov. 8, 2006 for Applicant Koito Manufacturing Co. Ltd.

* cited by examiner

*Primary Examiner*—John Anthony Ward
(74) *Attorney, Agent, or Firm*—Sughrue Mion, PLLC

(57) ABSTRACT

For light irradiation transversely inclined with respect to the front of a vehicle lighting device that reflects light from a plurality of semiconductor light emitting devices toward the forward part of the lighting device via reflector, a structure is provided in which lights emitted from five semiconductor light emitting devices are reflected toward the forward part of a lighting device via reflector. A reflecting surface of the reflector is a parabolic cylindrical curved surface having a focal line extended horizontally. The five semiconductor light emitting devices are on the focal line at an interval. Each of the directions of the emitted lights is varied for each semiconductor light emitting device with respect to the focal line direction. Consequently, the light emitted from each of the semiconductor light emitting devices is not diffused vertically but only horizontally, thereby forming five oblong light distribution patterns in positions shifted from each other horizontally.

13 Claims, 11 Drawing Sheets

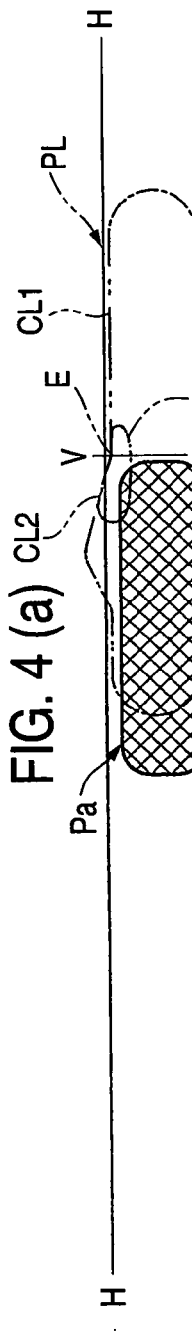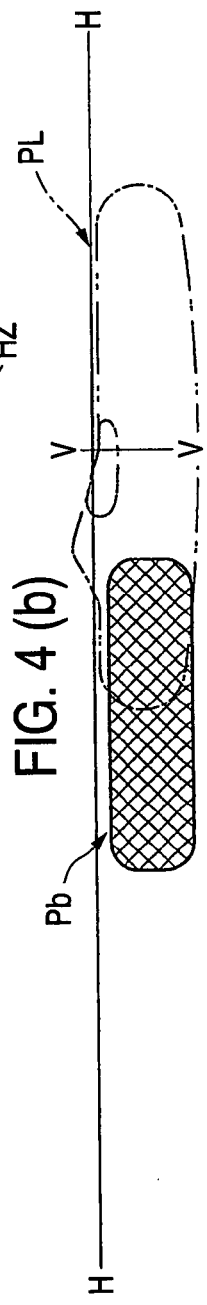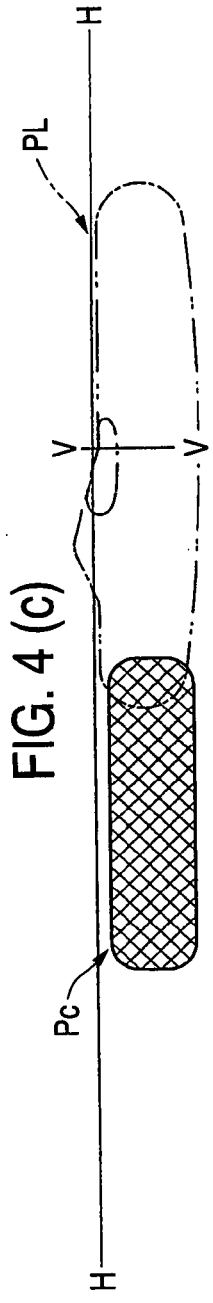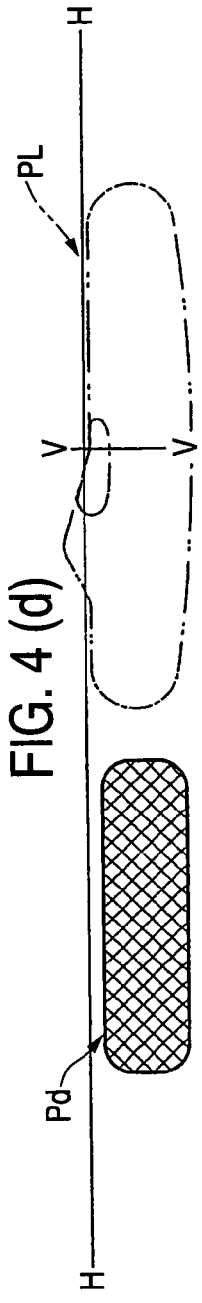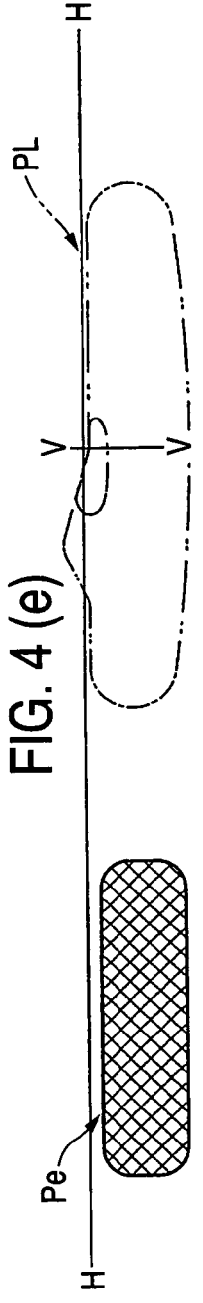
FIG. 4 (a) FIG. 4 (b) FIG. 4 (c) FIG. 4 (d) FIG. 4 (e)

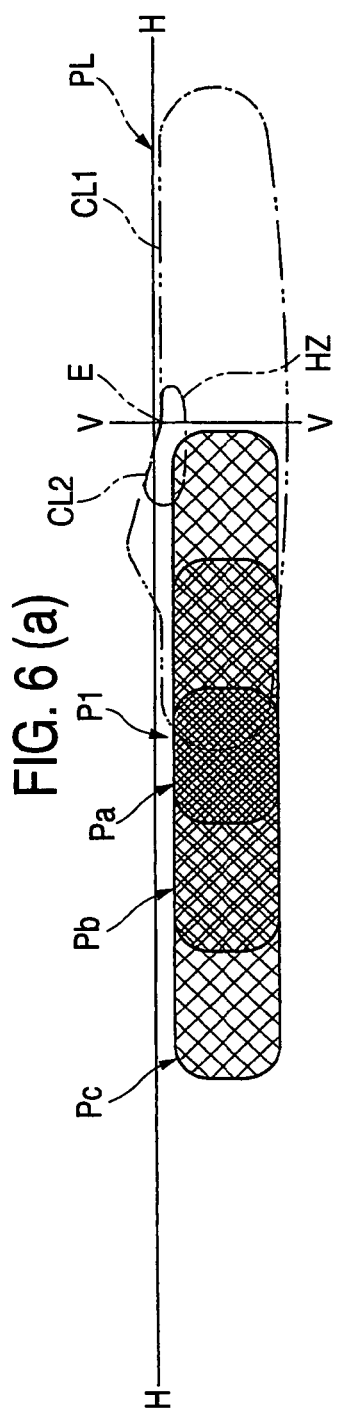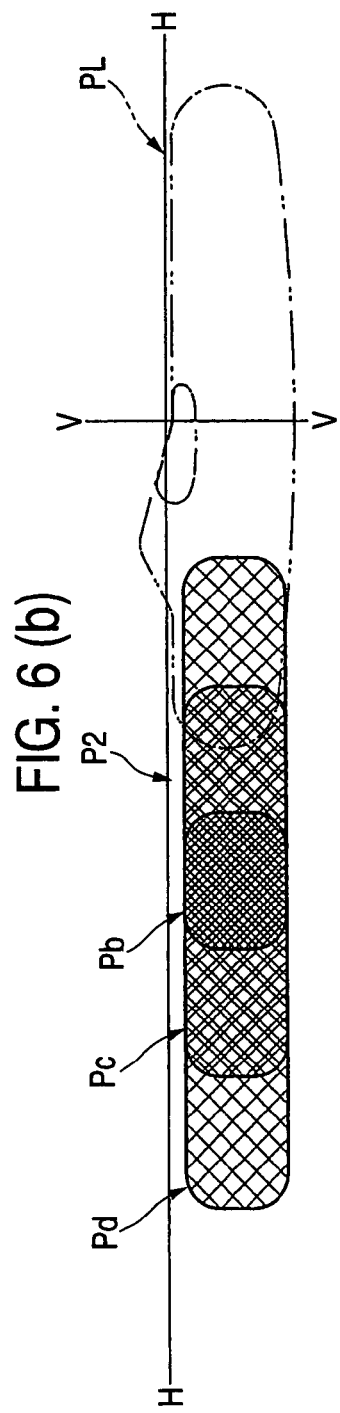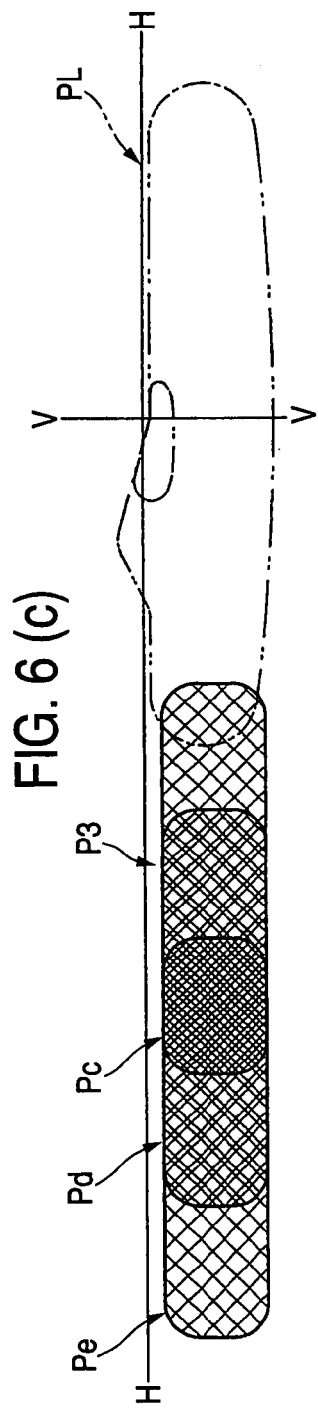

LIGHTING DEVICE FOR VEHICLE

The present application claims priority under 35 USC 119 based on Japanese Patent Application No. 2003-286883, filed Aug. 5, 2003, the contents of which is incorporated herein by reference.

BACKGROUND OF THE INVENTION

1. Technical Field

The present invention relates to a lighting device for a vehicle that reflect lights emitted from a plurality of semiconductor light emitting devices toward the forward part of the lighting device by a reflector.

2. Related Art

As described in Japanese patent application JP-A-11-306810, for example, a related art lighting device for a vehicle reflects lights from a plurality of semiconductor light emitting devices toward the forward part of the lighting device by means of a reflector.

Moreover, Japanese patent application JP-A-2003-31007 has described a related art vehicle lighting device that reflects lights from a plurality of semiconductor light emitting devices arranged rectilinearly in a horizontal direction toward the forward part of the lighting device by means of a reflector.

By employing the lighting device for a vehicle described in JP-A-2003-31007, it is possible to form an oblong light distribution pattern by the structure of a compact lighting device. However, there is a related art problem in that it is impossible to sufficiently irradiate light in a great transverse inclined direction to the direction of the front of the lighting device.

SUMMARY OF THE INVENTION

It is an object of the invention to provide a lighting device for a vehicle that reflects lights emitted from a plurality of semiconductor light emitting devices toward the forward part of the lighting device by means of a reflector, in which light irradiation can be sufficiently carried out in a great transverse inclined direction to the direction of the front of the lighting device. However, the present invention need not achieve this object or any other object.

The invention includes devising the direction of a light emitted from a semiconductor light emitting device.

More specifically, an exemplary, non-limiting embodiment of the invention provides a lighting device for a vehicle, which is constituted to reflect lights emitted from a plurality of semiconductor light emitting devices toward a forward part of the lighting device by means of a reflector, wherein a reflecting surface of the reflector is constituted by a parabolic cylindrical curved surface having a focal line extended in a horizontal direction, and the semiconductor light emitting devices are provided on the focal line at a predetermined interval, and a direction of a light emitted from at least one of the semiconductor light emitting devices is set to be different from directions of the other semiconductor light emitting devices with respect to a direction of the focal line.

The type of the "lighting device for a vehicle" is not particularly restricted but it is possible to employ a headlamp, a fog lamp, a cornering lamp, a tail lamp, a stop lamp, a backup lamp, a turn signal lamp and a daytime running lamp, for example.

The "forward part of the lighting device" may be coincident with the forward part of the vehicle or may not be coincident therewith.

The type of the "semiconductor light emitting device" is not particularly restricted but a light emitting diode or a laser diode can be employed, for example.

DETAILED DESCRIPTION OF THE INVENTION

An embodiment of the invention will be described below with reference to the drawings.

Figure 1:
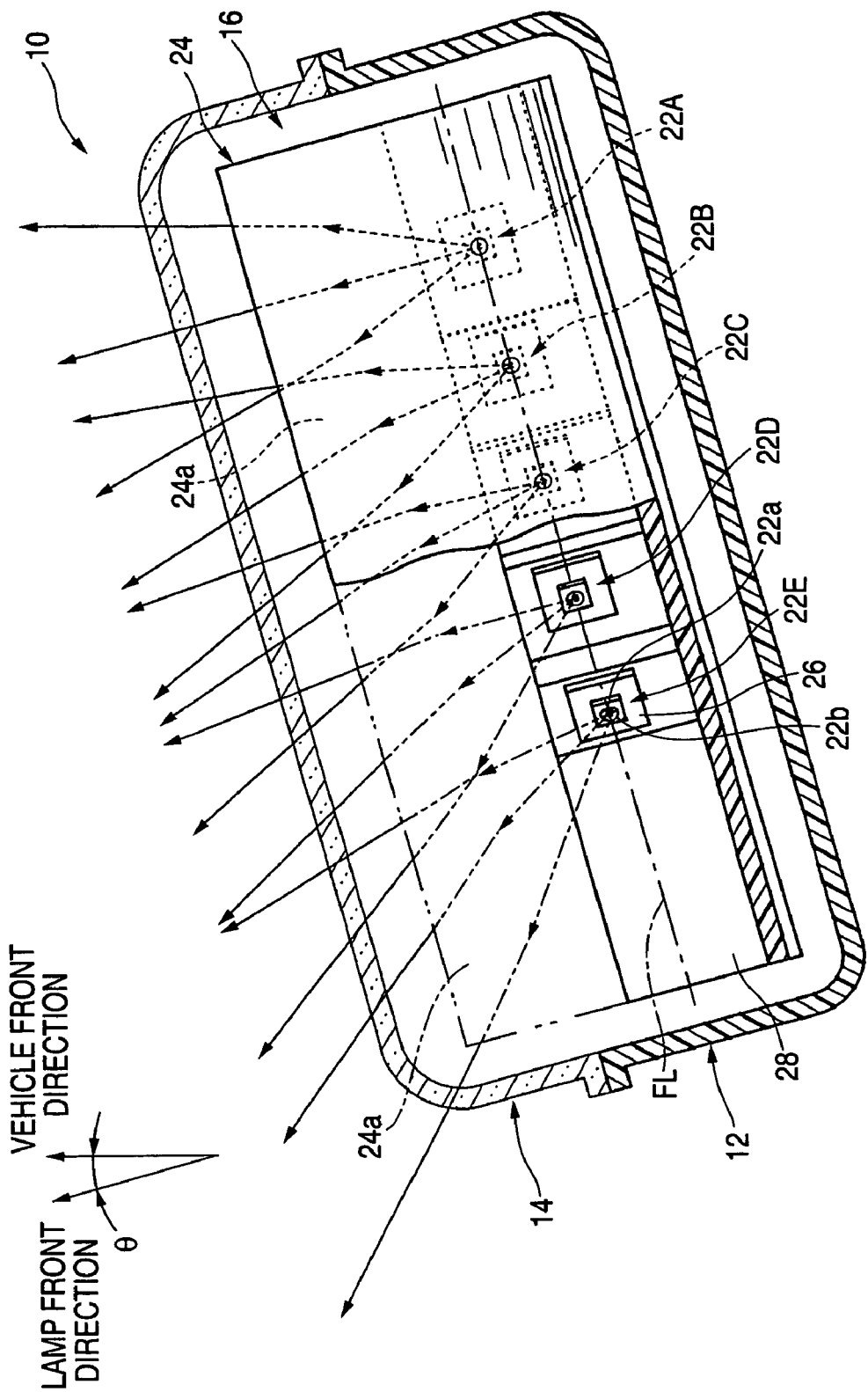
FIG. 1 is a sectional plan view showing a lighting device for a vehicle according to an exemplary, non-limiting embodiment of the present invention.

FIG. 1 is a sectional plan view showing a lighting device for a vehicle according to an exemplary, non-limiting embodiment of the present invention. A lighting device 10 for a vehicle is a cornering lamp to be provided on the left and front end of the vehicle, and irradiates a light on a forward part in a turning direction when the vehicle turns. In the lighting device 10, a lighting unit 16 is accommodated in a lamp housing formed by a lamp body 12 and a translucent cover 14 attached to an opening portion on a front end thereof, and the direction of the front is inclined at a predetermined angle θ (for example, θ=15°) leftward with respect to the direction of the front of the vehicle.

Figure 2:
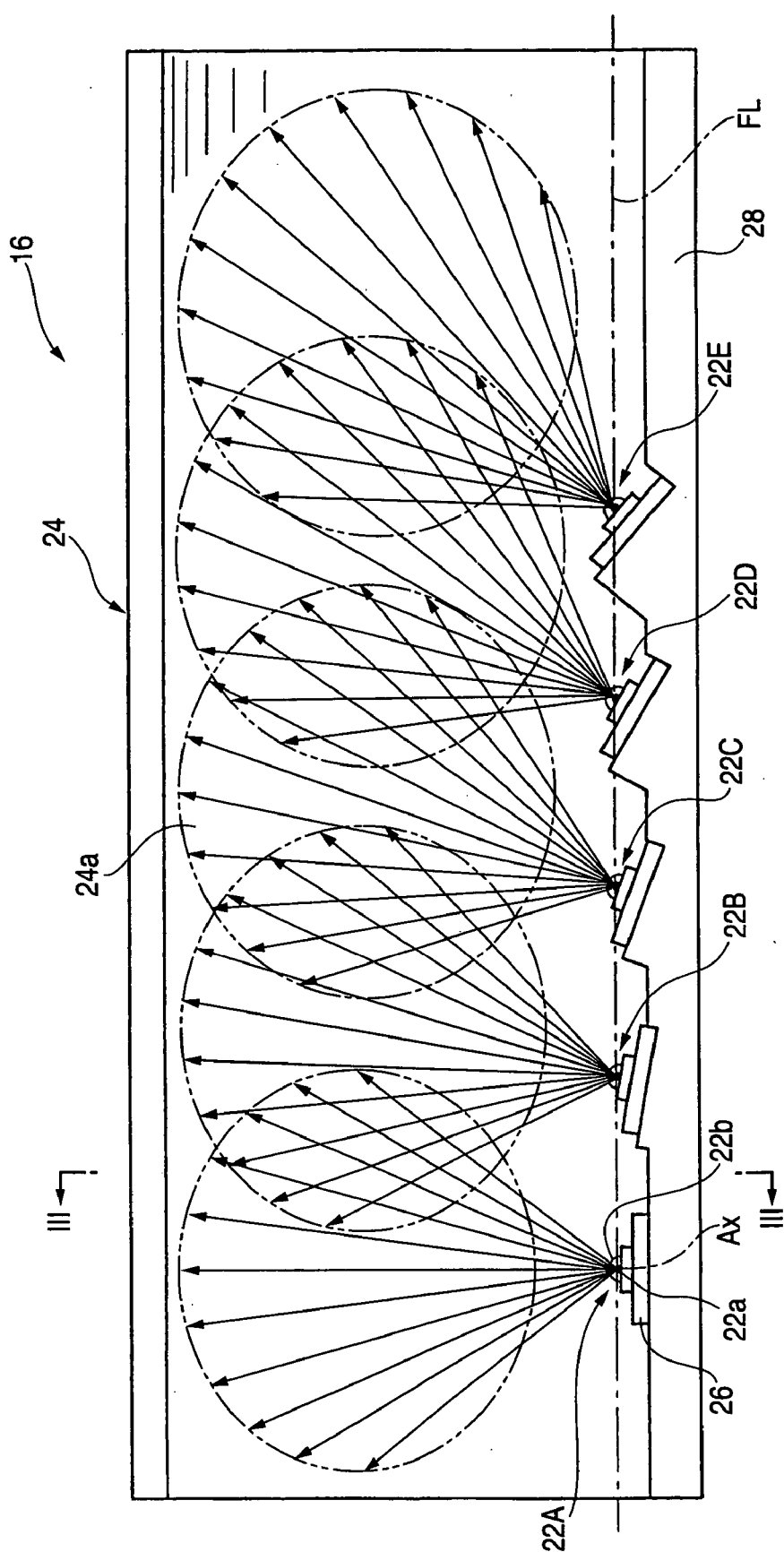
FIG. 2 is a view showing a lighting unit in the lighting device for a vehicle as seen in the direction of the front of the lighting device according to an exemplary, non-limiting embodiment of the present invention.
Figure 3:
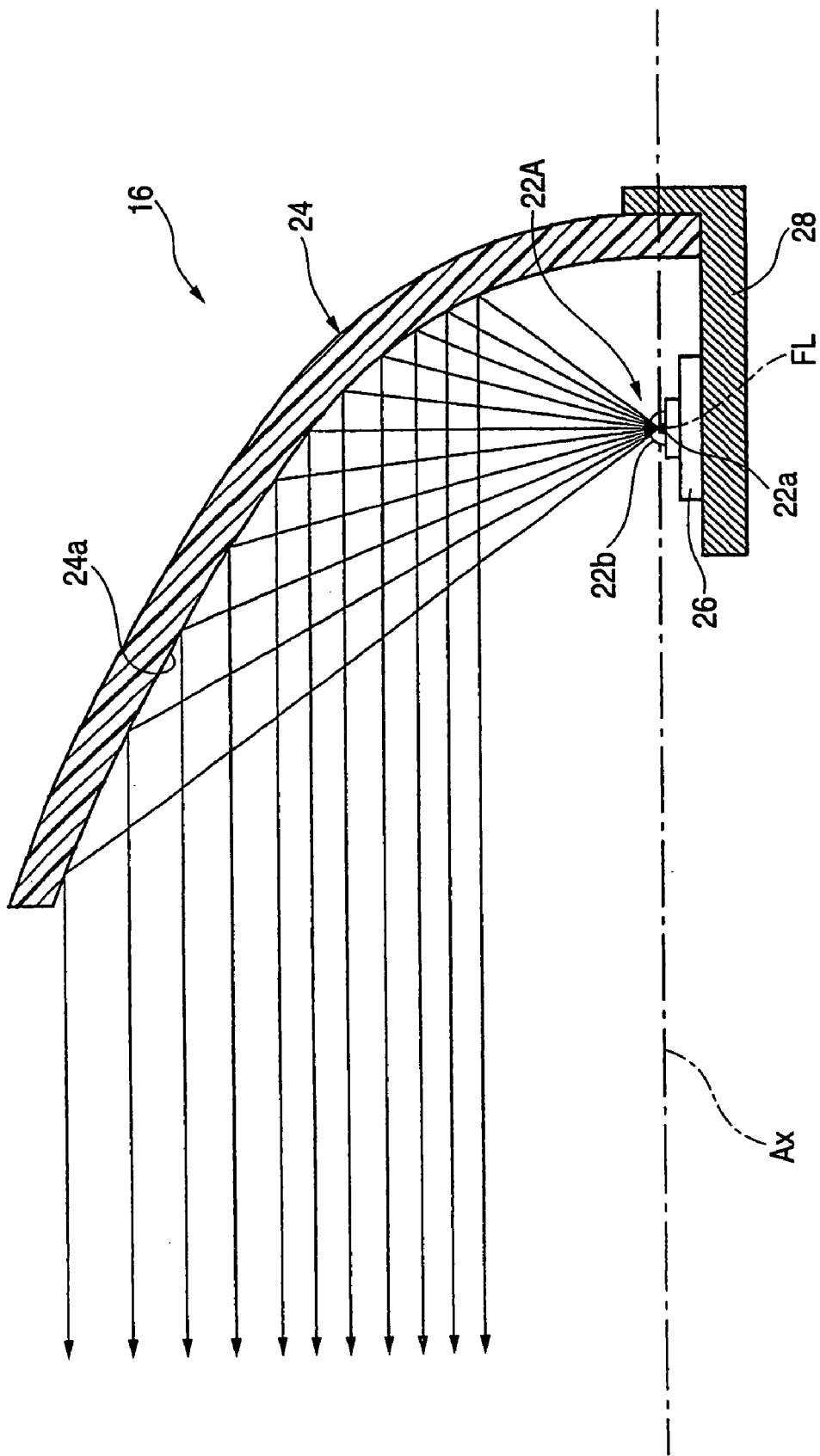
FIG. 3 is a sectional view taken along a III—III line in FIG. 2 according to an exemplary, non-limiting embodiment of the present invention, FIGS. 4(*a*)–4(*e*) are views showing an oblong light distribution pattern formed on a virtual vertical screen in front of a vehicle by a light reflected from a reflector when the semiconductor light emitting devices of the lighting unit are turned on one by one, according to an exemplary, non-limiting embodiment of the present invention.

FIG. 2 is a view showing the lighting unit 16 seen in the direction of the front of the lighting device and FIG. 3 is a sectional view taken along a III—III line in FIG. 2. The lighting unit 16 reflects lights emitted from five semiconductor light emitting devices 22A, 22B, 22C, 22D and 22E toward the forward part of the lighting device by means of a reflector 24.

A reflecting surface 24a of the reflector 24 is constituted by a parabolic cylindrical curved surface having a focal line FL extended in a horizontal direction and is fixed to the rear end of a support member 28 extended in the direction of the focal line FL at a lower edge in a rear part thereof.

Each of the semiconductor light emitting devices 22A, 22B, 22C, 22D and 22E is a light emitting diode for emitting a white light, and includes a light emitting chip 22a and a sealing resin 22b for sealing the light emitting chip 22a to be covered substantially semispherically. Each of the semiconductor light emitting devices 22A, 22B, 22C, 22D and 22E is provided on the focal line FL at an interval and is fixed to the support member 28 through a substrate 26 with the light emitting chip 22a turned upward.

The directions of the lights emitted from the semiconductor light emitting devices 22A, 22B, 22C, 22D and 22E are different from each other with respect to the direction of the focal line FL in a vertical plane including the focal line FL. More specifically, the direction of the light emitted from the semiconductor light emitting device 22A positioned on an inner end in a side direction is vertically upward, the direction of the light emitted from the semiconductor light emitting device 22B positioned adjacently thereto is inclined by approximately 10° outward in the side direction with respect to the vertically upward direction, the direction of the light emitted from the semiconductor light emitting device 22C positioned adjacently thereto is inclined by approximately 20° outward in the side direction with respect to the vertically upward direction, the direction of the light emitted from the semiconductor light emitting device 22D positioned adjacently thereto is inclined by approximately 30° outward in the side direction with respect to the vertically upward direction, and the direction of the light emitted from the semiconductor light emitting device 22E positioned on an outer end in the side direction is inclined by approximately 40° outward in the side direction with respect to the vertically upward direction.

To implement the foregoing, the support member 28 is formed like a slant face in which portions for supporting the substrates 26 of the four semiconductor light emitting devices 22B, 22C, 22D and 22E other than the semiconductor light emitting device 22A have different inclination angles from each other.

As shown in FIG. 3, in the reflecting surface 24a of the reflector 24, the shape of a vertical section orthogonal to the focal line FL is constituted by a parabola setting, as an axis, an axis Ax extended in the longitudinal direction of the lighting device. Moreover, each of the semiconductor light emitting devices 22A, 22B, 22C, 22D and 22E is provided on the focal line FL. Therefore, the light emitted from each of the semiconductor light emitting devices 22A, 22B, 22C, 22D and 22E reflected by the reflector 24 is not diffused in a vertical direction but only a horizontal direction. Consequently, an oblong light distribution pattern is formed ahead of the lighting device.

FIG. 4 is a view showing oblong light distribution patterns Pa, Pb, Pc, Pd and Pe formed on a virtual vertical screen positioned 25 m in front of the vehicle by the light reflected from the reflector 24 when the semiconductor light emitting devices 22B, 22C, 22D and 22E are turned on one by one.

As shown in FIG. 4(a), the oblong light distribution pattern Pa formed when the semiconductor light emitting device 22A provided vertically upward is turned on is expanded in the horizontal direction around the direction of the front of the lighting device (that is, an inclined direction at a predetermined angle θ leftward from the direction of the front of the vehicle).

As shown in FIGS. 4(b) to 4(e), the oblong light distribution patterns Pb, Pc, Pd and Pe formed when the semiconductor light emitting devices 22B, 22C, 22D and 22E provided in an inclined direction from the vertically upward part are turned on are expanded in the horizontal direction on the further left side from the oblong light distribution pattern Pa. In that case, the amount of displacement of each of the oblong light distribution patterns Pb, Pc, Pd and Pe in a leftward direction from the oblong light distribution pattern Pa has a value substantially proportional to the inclination angle of each of the semiconductor light emitting devices 22B, 22C, 22D and 22E.

In FIG. 4, a light distribution pattern PL shown in a two-dotted chain line is a light distribution pattern for a low beam formed by a light irradiation from a headlamp not shown. The light distribution pattern PL for a low beam has a horizontal cutoff line CL1 and an oblique cutoff line CL2 on an upper end, and an elbow point E to be an intersecting point of both of the cutoff lines is positioned slightly below a vanishing point H-V in the direction of the front of the vehicle (more specifically, below at approximately 0.5° to 0.6°). The light distribution pattern PL for a low beam is provided with a hot zone HZ to surround the elbow point E slightly leftward.

In the lighting device 10 for a vehicle according to the embodiment, the lighting unit 16 is provided slightly downward in the lamp housing (more specifically, such that the axis Ax is provided slightly downward in the longitudinal direction of the lighting device) to position the upper edges of the oblong light distribution patterns Pa, Pb, Pc, Pd and Pe slightly downward from the horizontal cutoff line CL1.

The lighting device 10 for a vehicle according to the exemplary, non-limiting embodiment of the present invention irradiates a light over a forward part in a turning direction when a steering operation for turning a vehicle in a leftward direction is carried out or a blinker operation in a left turning direction is carried out in a state in which the headlamp is turned on. In that case, three predetermined ones of the five semiconductor light emitting devices 22A, 22B, 22C, 22D and 22E are selectively turned on.

Figure 5:
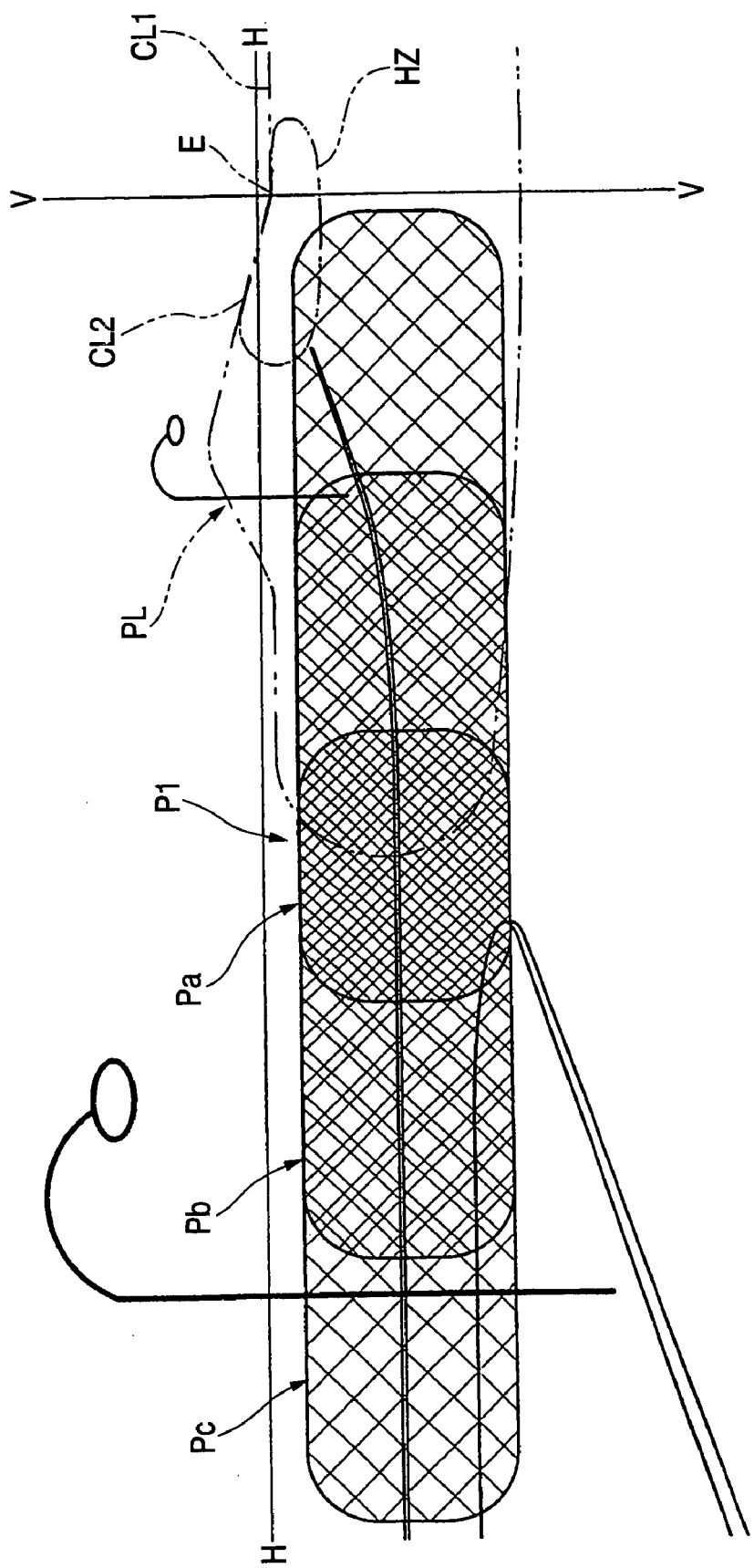
FIG. 5 is a perspective view showing a light distribution pattern formed on the virtual vertical screen by a light irradiated from the lighting device for a vehicle when a blinker operation in a left turning direction is carried out, according to an exemplary, non-limiting embodiment of the present invention, FIGS. 6(*a*)–6(*c*) are views showing a light distribution pattern formed on the virtual vertical screen by a light irradiated from the lighting device for a vehicle when a steering operation is actually carried out according to an exemplary, non-limiting embodiment of the present invention.

FIG. 5 is a perspective view showing a light distribution pattern formed on the virtual vertical screen by a light irradiated from the lighting device 10 for a vehicle when the blinker operation in the left turning direction is carried out.

When the blinker operation in the left turning direction is carried out, the three semiconductor light emitting devices 22A, 22B and 22C are turned on so that a synthetic oblong light distribution pattern P1 formed by the three oblong light distribution patterns Pa, Pb and Pc is formed even if the steering operation has not been performed yet. Consequently, a light is greatly irradiated on a road surface in the left and forward part of the vehicle together with the light distribution pattern PL for a low beam, thereby enhancing a visibility for a left turning admission passage.

FIG. 6 is a view showing a light distribution pattern formed on the virtual vertical screen by the light irradiated from the lighting device 10 for a vehicle when the steering operation is actually carried out.

As shown in FIG. 6(a), when a steering angle is small, the three semiconductor light emitting devices 22A, 22B and 22C are turned on to form the synthetic oblong light distribution pattern P1 including the three oblong light distribution patterns Pa, Pb and Pc in the same manner as the execution of the blinker operation. Consequently, a light is greatly irradiated on a road surface in the left and forward part of the vehicle together with the light distribution pattern PL for a low beam.

As shown in FIG. 6(b), when the steering angle is increased, the three semiconductor light emitting devices 22B, 22C and 22D are turned on to form a synthetic oblong light distribution pattern P2 including the three oblong light distribution patterns Pb, Pc and Pd. Consequently, a light irradiation in a great leftward inclined direction with respect to the direction of the front of the vehicle is sufficiently carried out.

As shown in FIG. 6(c), when the steering angle is further increased, the three semiconductor light emitting devices 22C, 22D and 22E are turned on to form a synthetic oblong light distribution pattern P3 including the three oblong light distribution patterns Pc, Pd and Pe. Consequently, a light irradiation in a greater leftward inclined direction to the direction of the front of the vehicle is sufficiently carried out.

As described above, the lighting device 10 for a vehicle according to the exemplary, non-limiting embodiment of the present invention reflects the lights emitted from the five semiconductor light emitting devices 22A, 22B, 22C, 22D and 22E toward the forward part of the lighting device 10 by the reflector 24. In that case, the reflecting surface 24a of the reflector 24 is constituted by the parabolic cylindrical curved surface having the focal line FL extended in the horizontal direction, and furthermore, the semiconductor light emitting devices 22A, 22B, 22C, 22D and 22E are provided on the focal line FL at the predetermined interval and the directions of the emitted lights are set to be varied for each of the semiconductor light emitting devices 22A, 22B, 22C, 22D and 22E with respect to the direction of the focal line FL. Accordingly, the following functions and advantages can be obtained.

Each of the semiconductor light emitting devices 22A, 22B, 22C, 22D and 22E is provided on the focal line FL of the parabolic cylindrical curved surface constituting the reflecting surface 24a of the reflector 24. Therefore, the light emitted from each of the semiconductor light emitting devices 22A, 22B, 22C, 22D and 22E reflected by the reflector 24 is not diffused in the vertical direction but only the horizontal direction. Consequently, the oblong light distribution patterns Pa, Pb, Pc, Pd and Pe are formed ahead of the lighting device. The directions of the lights emitted from the semiconductor light emitting devices 22A, 22B, 22C, 22D and 22E are set to be different from each other with respect to the direction of the focal line FL. Consequently, it is possible to form the five oblong light distribution patterns Pa, Pb, Pc, Pd and Pe in the shifted positions from each other in the horizontal direction.

According to this exemplary, non-limiting embodiment, it is possible to sufficiently carry out a light irradiation in a great leftward inclined direction to the direction of the front of the lighting device. Consequently, the lighting device 10 for a vehicle can be suitable for a cornering lamp.

In addition, in the embodiment, the direction of the light emitted from each of the semiconductor light emitting devices 22A, 22B, 22C, 22D and 22E is gradually changed from the semiconductor light emitting device 22A positioned on one end in the direction of the focal line toward the semiconductor light emitting device 22E positioned on the other end in the direction of the focal line. Therefore, it is possible to form the five oblong light distribution patterns Pa, Pb, Pc, Pd and Pe with a gradual horizontal shift from the direction of the front of the lighting device toward the transverse direction with respect to the direction of the front of the lighting device. Consequently, it is possible to precisely carry out a light irradiation in a necessary direction.

In the embodiment, only three of the five semiconductor light emitting devices 22A, 22B, 22C, 22D and 22E are selectively turned on. Therefore, it is possible to reduce a power consumption, and furthermore, to carry out a light irradiation in a necessary direction corresponding to the running situation of the vehicle.

In the lighting device 10 for a vehicle according to the exemplary, non-limiting embodiment of the present invention, the direction of the front thereof is the leftward inclined direction at the predetermined angle θ to the direction of the front of the vehicle. Consequently, it is possible to more easily carry out the light irradiation in the great leftward inclined direction to the direction of the front of the lighting device 10.

In this exemplary, non-limiting embodiment of the present invention, the description has been given to the case in which the lighting device 10 for a vehicle is the cornering lamp provided on the left and front end of the vehicle. Also in case of a cornering lamp provided on the right and front end of the vehicle, the same functions and advantages as those in the embodiment can be obtained with a symmetrical structure with respect to the lighting device 10 for a vehicle.

In the present embodiment, the description has been given to the case in which the lighting device 10 for a vehicle has such a structure that the lighting unit 16 is accommodated in the lamp housing formed by the lamp body 12 and the translucent cover 14. It is also possible to directly attach the translucent cover to the lighting unit 16, thereby constituting the lighting device for a vehicle. Also in such a case, it is possible to obtain the same functions and advantages as those of the foregoing embodiment.

Next, an exemplary, non-limiting variant of the foregoing embodiment of the present invention will be described.

Figure 7:
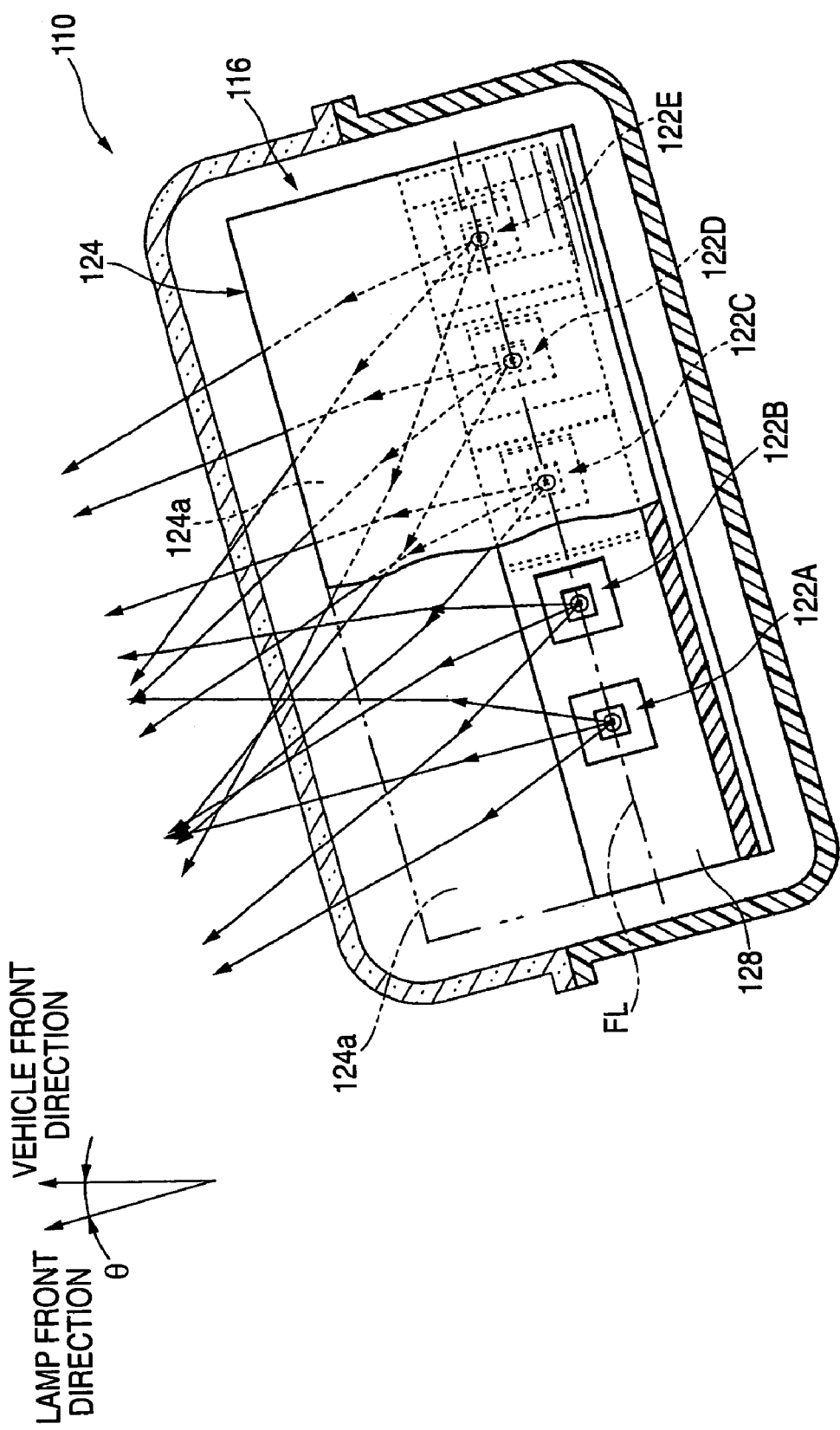
FIG. 7 is the same view as FIG. 1, illustrating a lighting device for a vehicle according to a first variant of the embodiment.
Figure 8:
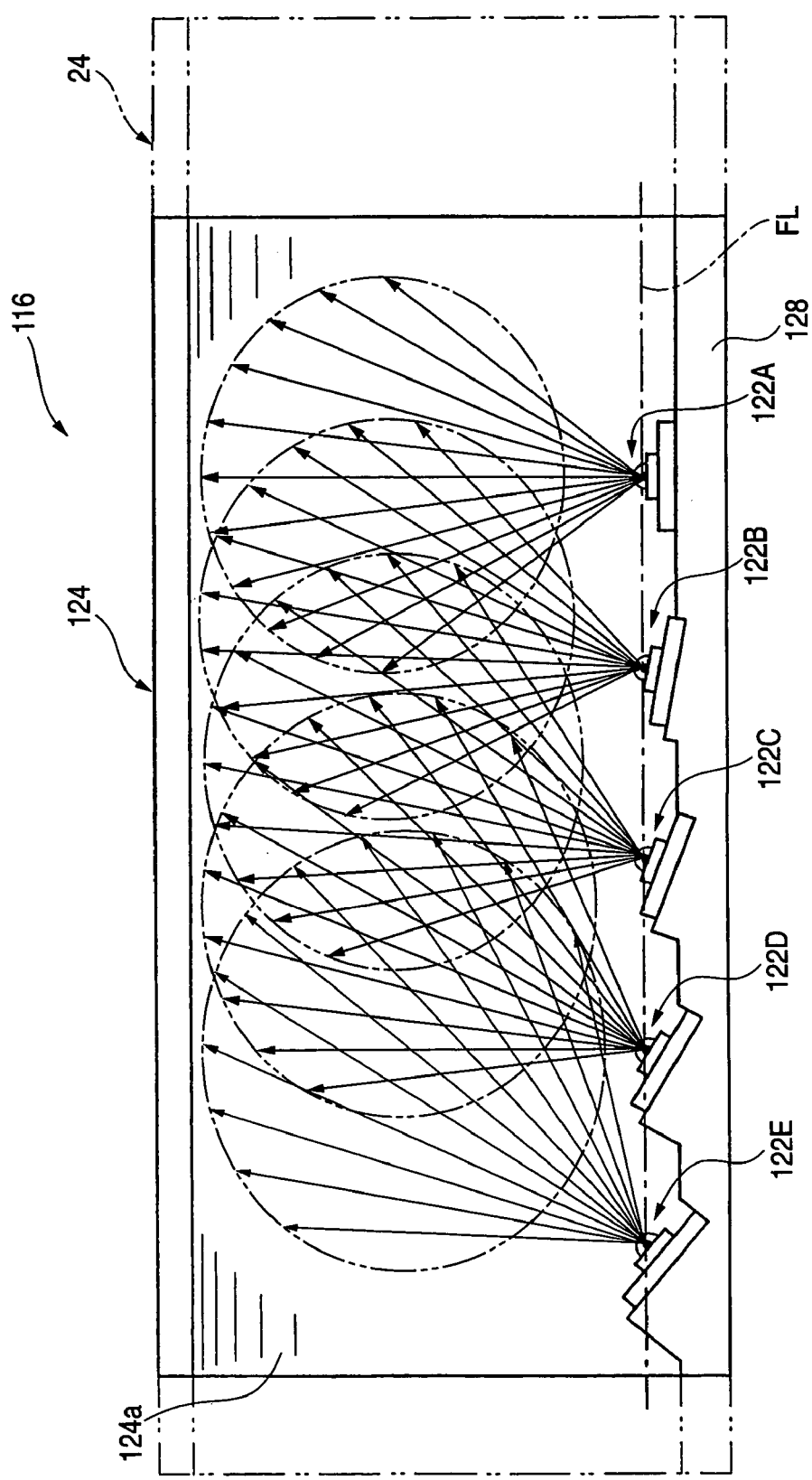
FIG. 8 is the same view as FIG. 2, illustrating a lighting unit in the lighting device for a vehicle according to the first variant of the embodiment.

FIG. 7 is the same view as FIG. 1, illustrating a lighting device for a vehicle according to a first exemplary, non-limiting variant of the embodiment, and FIG. 8 is the same view as FIG. 2, illustrating a lighting unit. A lighting device 110 for a vehicle according to the variant is the same as that in the embodiment, in that a lighting unit 116 is constituted to reflect lights emitted from five semiconductor light emitting devices 122A, 122B, 122C, 122D and 122E toward the forward part of the lighting device 110 by means of a reflector 124 and the semiconductor light emitting devices 122A, 122B, 122C, 122D and 122E are provided at a predetermined interval on a focal line FL of a parabolic cylindrical curved surface constituting a reflecting surface 124a of the reflector 124. However, the array of the semiconductor light emitting devices 122A, 122B, 122C, 122D and 122E is different from that in the foregoing exemplary, non-limiting embodiment of the present invention.

More specifically, the attachment postures of the semiconductor light emitting devices 122A, 122B, 122C, 122D and 122E to a support member 128 correspond to those of the semiconductor light emitting devices 22A, 22B, 22C, 22D and 22E in the embodiment. However, in contrast, the semiconductor light emitting device 122A corresponding to the semiconductor light emitting device 22A is positioned on an outer end in a side direction and the semiconductor light emitting device 122E corresponding to the semiconductor light emitting device 22E is positioned on an inner end in the side direction.

Further, the direction of the light emitted from the semiconductor light emitting device 122A positioned on the outer end in the side direction is set vertically upward, the direction of the light emitted from the semiconductor light emitting device 122E positioned on the inner end in the side direction is greatly inclined close to the outer end in the side direction, and the directions of the lights emitted from the semiconductor light emitting devices 122B, 122C and 122D positioned in the middle thereof are greatly inclined gradually toward the outer end in the side direction.

By employing the structure according to the variant, positions in which the lights emitted from the semiconductor light emitting devices 122A, 122B, 122C, 122D and 122E are incident on the reflecting surface 124a of the reflector 124 can be caused to overlap over a considerable range.

In contrast to the reflector 24 according to the exemplary, non-limiting embodiment shown in a two-dotted chain line of FIG. 8, the necessary width of the reflector 124 can be reduced as shown in a solid line of FIG. 8. Correspondingly, the lighting device 110 for a vehicle can be constituted to be compact.

Figure 9:
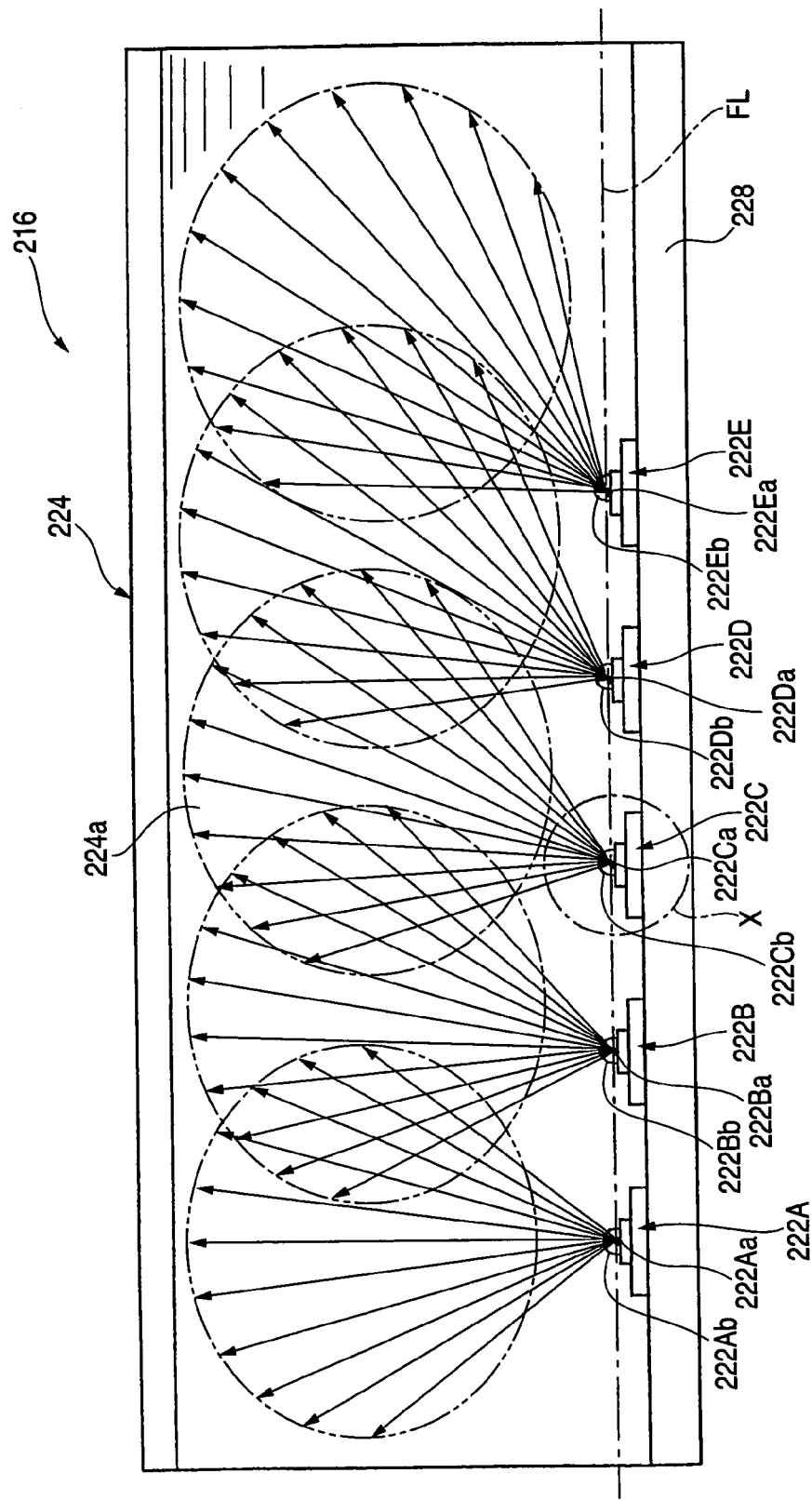
FIG. 9 is the same view as FIG. 2, illustrating a lighting unit according to a second variant of the embodiment.
Figure 10:
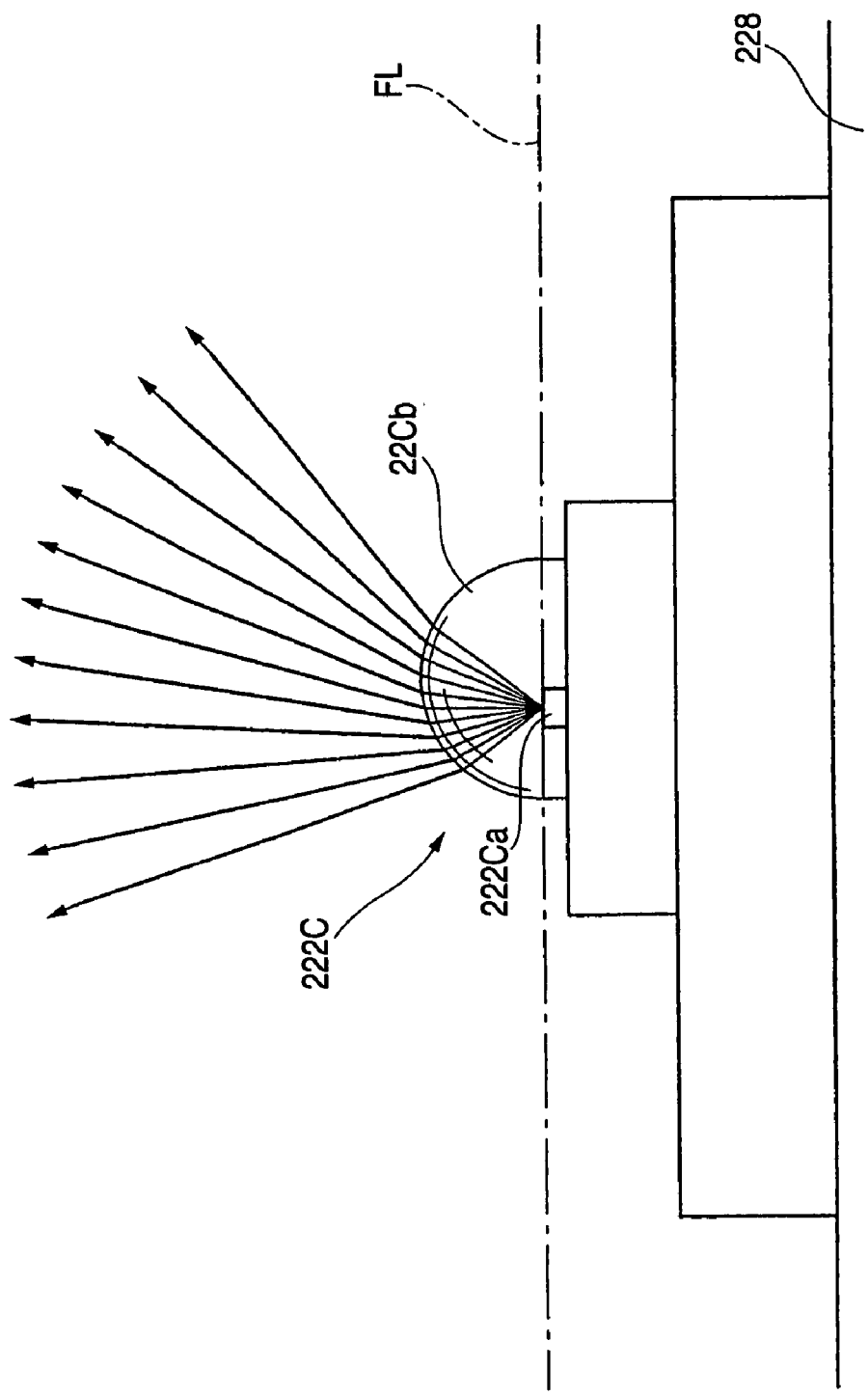
FIG. 10 is a detailed view showing an X portion in FIG. 9 according to an exemplary, non-limiting embodiment of the present invention.

FIG. 9 is the same view as FIG. 2, illustrating a lighting unit 216 according to a second exemplary, non-limiting variant of the embodiment, and FIG. 10 is a detailed view showing an X portion in FIG. 9.

As shown in FIG. 9, the lighting unit 216 according to the second variant is the same as that in the embodiment in that it is constituted to reflect lights emitted from five semiconductor light emitting devices 222A, 222B, 222C, 222D and 222E toward the forward part of a lighting device by means of a reflector 224 and the semiconductor light emitting devices 222A, 222B, 222C, 222D and 222E are provided at a predetermined interval on a focal line FL of a parabolic cylindrical curved surface constituting a reflecting plane 224a of the reflector 224, and the structures of the semiconductor light emitting devices 222A, 222B, 222C, 222D and 222E themselves and their attachment postures to a support member 228 are different from those in the embodiment.

More specifically, all of the semiconductor light emitting devices 222A, 222B, 222C, 222D and 222E are provided vertically upward in the same manner as the semiconductor light emitting device 22A in the embodiment, and the sealing shapes of sealing resins are set to be different from each other. A sealing resin 222Ab of the semiconductor light emitting device 222A positioned on an outer end in a side direction has a substantially semispherical surface shape around a light emitting chip 222Aa, and sealing resins 222Bb, 222Cb, 222Db and 222Eb of the semiconductor light emitting devices 222B, 222C, 222D and 222E have substantially semispherical surface shapes around close positions to outer ends in the side direction from light emitting chips 222Ba, 222Ca, 222Da and 222Ea to be sealing objects. The amount of displacement is set to be gradually increased in order of the semiconductor light emitting devices 222B, 222C, 222D and 222E.

As shown in FIG. 10 illustrating the semiconductor light emitting device 222C, the sealing resin 222Cb is displaced close to the outer end in the side direction with respect to the light emitting chip 222Ca. Therefore, the light emitted from the light emitting chip 222Ca is not incident vertically on the surface of the sealing resin 222Cb, and therefore is refracted close to the outer end in the side direction over the surface. Consequently, the direction of a light emitted from the semiconductor light emitting device 222C is inclined outward in the side direction with respect to a vertically upward part. In that case, it is possible to set the directions of the lights emitted from the semiconductor light emitting devices 222B, 222C, 222D and 222E to be inclined at approximately 10°, 20°, 30° and 40° outward in the side direction with respect to the vertically upward part in the same manner as in the embodiment by properly setting the amount of displacement of each of the sealing resins 222Bb, 222Cb, 222Db and 222Eb.

By employing the structure according to the variant, it is possible to set each of the directions of the lights emitted from the semiconductor light emitting devices 222A, 222B, 222C, 222D and 222E to be varied for each of the semiconductor light emitting devices 222A, 222B, 222C, 222D and 222E in a state in which the semiconductor light emitting devices 222A, 222B, 222C, 222D and 222E are arranged in an identical posture. Consequently, the support member 228 can be formed like a plate. Thus, the structure of a lighting device can be simplified.

Figure 11:
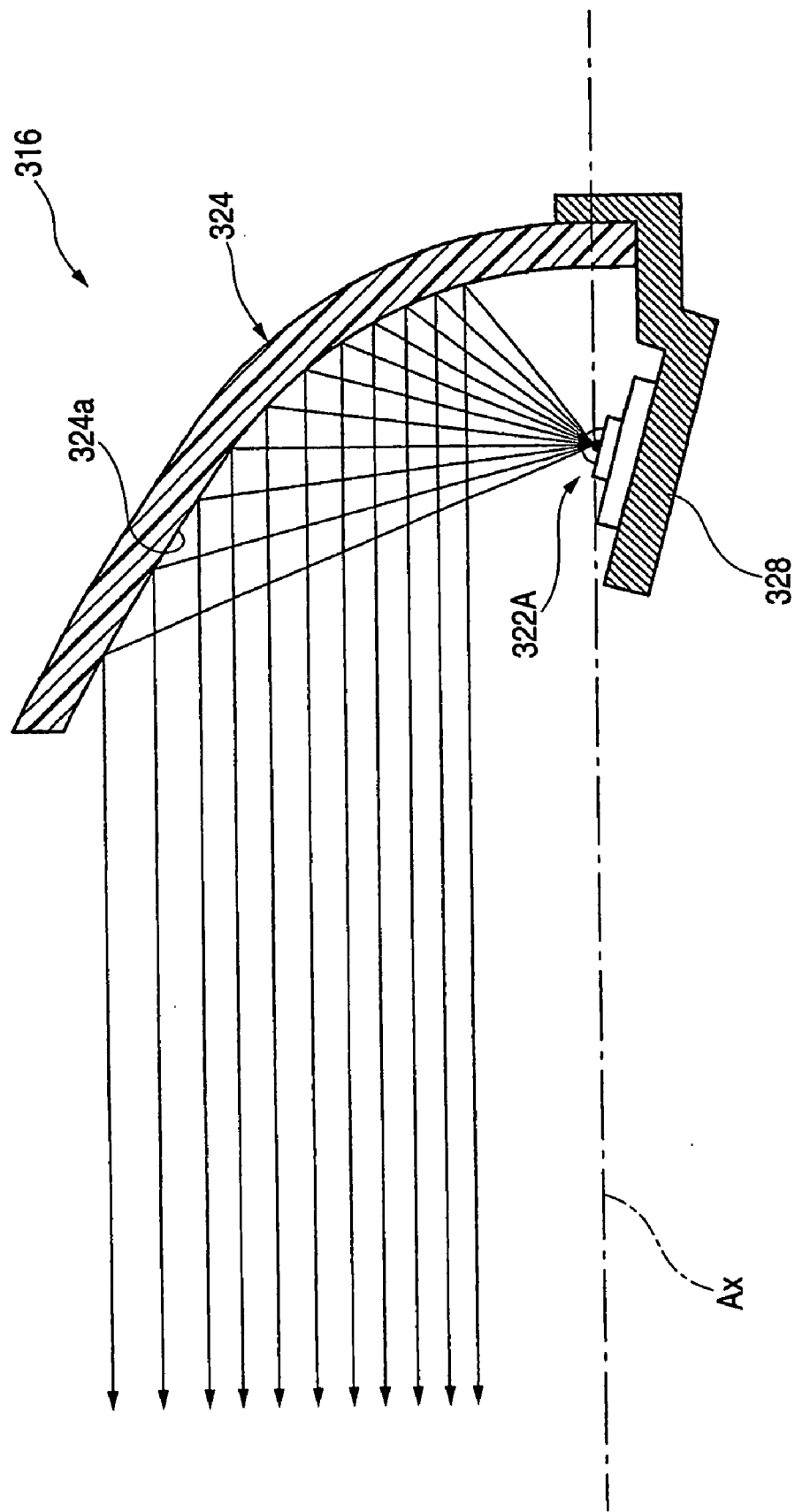
FIG. 11 is the same view as FIG. 3, illustrating a lighting unit according to a third variant of the embodiment.

FIG. 11 is the same view as FIG. 3, illustrating a lighting unit 316 according to a third exemplary, non-limiting variant of the foregoing embodiment of the present invention. The lighting unit 316 according to the variant has the same basic structure as that in the foregoing embodiment. Further, the direction of a semiconductor light emitting device 322A is inclined at a predetermined angle rearward in a lighting device with respect to a vertically upward part. A support member 328 also has a corresponding shape thereto. The directions of four residual semiconductor light emitting devices not shown are also inclined at predetermined angles rearward in the lighting device with respect to the vertically upward part in the same manner as the semiconductor light emitting device 322A.

By employing the structure according to the variant, it is possible to shift the position of incidence from the semiconductor light emitting device 322A onto a reflecting surface 324a of a reflector 324 close to the rear part of the lighting device. Correspondingly, the forward protruding length of the reflector 324 can be decreased. Consequently, the size of the lighting unit 316 can be reduced.

The present invention has various advantages. For example, but not by way of limitation, as shown in the structure, the lighting device for a vehicle according to the invention reflects the lights emitted from a plurality of semiconductor light emitting devices toward the forward part of the lighting device by means of the reflector. In that case, the reflecting surface of the reflector includes the parabolic cylindrical curved surface having the focal line extended in the horizontal direction, and furthermore, the semiconductor light emitting devices are provided on the focal line at the predetermined interval, and the direction of the light emitted from at least one of the semiconductor light emitting devices is set to be different from the directions of the other semiconductor light emitting devices with respect to the direction of the focal line. Therefore, the following functions and advantages can be obtained.

Each of the semiconductor light emitting devices is provided on the focal line of the parabolic cylindrical curved surface constituting the reflecting surface of the reflector. Therefore, the light emitted from each of the semiconductor light emitting devices reflected by the reflector is not diffused in a vertical direction but only in a horizontal direction. Consequently, an oblong light distribution pattern is formed ahead of the lighting device. The direction of the light emitted from at least one of the semiconductor light emitting devices is set to be different from the directions of the other semiconductor light emitting devices with respect to the direction of the focal line.

Accordingly, it is possible to form a plurality of oblong light distribution patterns in shifted positions from each other in the horizontal direction.

According to the present invention, it is possible to sufficiently carry out light irradiation in a great transverse inclined direction to the direction of the front of a lighting device for a vehicle that reflects lights emitted from a plurality of semiconductor light emitting devices toward the forward part of the lighting device by means of a reflector. Consequently, the lighting device for a vehicle can be suitable for a cornering lamp.

In the structure, there is not particularly restricted a specific structure for setting the direction of the light emitted from at least one of the semiconductor light emitting devices to be different from the directions of the other semiconductor light emitting devices with respect to the direction of the focal line. If each of the semiconductor light emitting devices has such a structure that includes a light emitting chip and a sealing resin for sealing the same and the sealing shape of the sealing resin is set to be varied by the at least one of the semiconductor light emitting devices and the other semiconductor light emitting devices, however, the direction of the light emitted from at least one of the semiconductor light emitting devices can be set to be different from the directions of the semiconductor light emitting devices in a state in which each of the semiconductor light emitting devices is provided in an identical posture. Consequently, the structure of the lighting device can be simplified.

The "sealing shape" implies the surface shape of the sealing resin with the semiconductor light emitting device to be a sealing object set to be in a reference position. Referring to a specific manner for "setting the sealing shape to be varied", it is also possible to employ a manner in which the surface shape itself of the sealing resin is different, a manner in which the surface shape itself of the sealing resin is identical and the position of a formation thereof is different, and a manner in which the surface shape of the sealing resin and the position of the formation thereof are different.

If the direction of the light emitted from each of the semiconductor light emitting devices is set to be gradually changed from the semiconductor light emitting device positioned on one end in the direction of the focal line toward the semiconductor light emitting device positioned on the other end in the direction of the focal line in the structure, it is possible to form a plurality of oblong light distribution patterns with a gradual horizontal shift from the direction of the front of the lighting device toward a transverse great inclined direction to the direction of the front of the lighting device. Consequently, it is possible to precisely carry out a light irradiation in a necessary direction.

In that case, if the direction of the light emitted from the semiconductor light emitting device positioned on one end in the direction of the focal line is set to be almost orthogonal to the direction of the focal line and the direction of the light emitted from the semiconductor light emitting device positioned on the other end in the direction of the focal line is set close to one end of the direction of the focal line, a position in which the lights emitted from the semiconductor light emitting devices are incident on the reflecting surface of the reflector can be caused to overlap over a considerable range. Consequently, it is possible to reduce the necessary width of the reflector. Correspondingly, it is possible to constitute the lighting device for a vehicle to be compact.

In the structure, a plurality of semiconductor light emitting devices may be turned on at the same time or only a part of the semiconductor light emitting devices may be selectively turned on. In the case in which the latter structure is employed, it is possible to reduce a power consumption, and furthermore, to carry out a light irradiation in a necessary direction depending on the running situation of a vehicle.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

I claim:

1. A lighting device for a vehicle, comprising:
a plurality of semiconductor light emitting devices that emit corresponding lights in a forward direction of the lighting device via a reflector,
wherein a reflecting surface of the reflector comprises a parabolic cylindrical curved surface having a focal line extended in a horizontal direction, and
the semiconductor light emitting devices are provided on the focal line at an interval, and an angle of a light emitted from at least one of the semiconductor light emitting devices is substantially different from respective angles of other ones of the semiconductor light emitting devices with respect to a direction of the focal line.

2. The lighting device according to claim 1, wherein each of the semiconductor light emitting devices includes a light emitting chip and a sealing resin for sealing the light emitting chip, and
a sealing shape of the sealing resin varies between at least one of the semiconductor light emitting devices and the other ones of the semiconductor light emitting devices.

3. The lighting device according to claim 1, wherein the angle of the light emitted from each of the semiconductor light emitting devices gradually varies from the semiconductor light emitting device positioned on one end in the direction of the focal line toward the semiconductor light emitting device positioned on the other end in the direction of the focal line.

4. The lighting device according to claim 3, wherein the angle of the light emitted from the semiconductor light emitting device positioned on the end in the direction of the focal line is set to be a direction which is substantially orthogonal to the direction of the focal line, and the direction of the light emitted from the semiconductor light emitting device positioned on the other end in the direction of the focal line is set to be a direction substantially at the end in the direction of the focal line.

5. The lighting device according to claim 1, wherein selected ones of the semiconductor light emitting devices can be selectively turned on based on a steering angle.

6. The lighting device of claim 1, wherein said lighting device is configured to be positioned at one of a left front end and a right front end of a vehicle, and said lighting device is inclined at an inclination angle.

7. The lighting device of claim 6, wherein said inclination angle is 15 degrees.

8. The lighting device of claim 1, wherein said reflector comprises a parabolic cylindrical curved surface attached to a support member of said lighting device.

9. The lighting device of claim 1, wherein each of said lighting devices comprises a light emitting diode for emitting white light, including a light emitting chip and a sealing resin that covers said light emitting chip substantially semispherically.

10. The lighting device of claim 1, wherein a first one of said plurality of light emitting devices is at a substantially vertical position, a second one of said plurality of lighting devices is angled about 10 degrees outward from said substantially vertical position, a third one of said plurality of lighting devices is angled about 20 degrees outward from said substantially vertical position, a fourth one of said plurality of lighting devices is angled about 30 degrees outward from said substantially vertical position, and a fifth one of said plurality of lighting devices is angled about 40 degrees outward from said substantially vertical position.

11. The lighting device of claim 1, wherein when said lighting device is in a blinker mode, the lighting device provides said light in a turning direction of said vehicle in direct relationship with a steering angle of said vehicle by using a corresponding subset of said plurality of light emitting devices.

12. The lighting device of claim 11, wherein said plurality of light emitting devices comprises five light emitting semiconductors, and said corresponding subset comprises three ones of said five light emitting semiconductors.

13. The lighting device of claim 1, wherein said plurality of light emitting devices is angled rearward.

* * * * *